(12) United States Patent
Murphy et al.

(10) Patent No.: US 8,861,660 B2
(45) Date of Patent: Oct. 14, 2014

(54) DIGITAL DATA-AIDED FREQUENCY OFFSET ESTIMATION

(71) Applicants: MStar Semiconductor, Inc., Hsinchu Hsien (TW); MStar Semiconductor, Inc., Grand Cayman (KY); MStar Software R&R (Shenzhen) Ltd., ShenZhen (CN)

(72) Inventors: Mark Murphy, Cambridge (GB); Craig Edward Burnet, Royston (GB); Cyril Valadon, Letchworth Garden (GB)

(73) Assignees: MStar Semiconductor, Inc., Grand Kayman (KY); MStar Semiconductor, Inc., Hsinchu Hsien (TW); MStar Software R&D (Shenzhen) Ltd., Shenzhen (CN)

( * ) Notice: Subject to any disclaimer, the term of this patent is extended or adjusted under 35 U.S.C. 154(b) by 53 days.

(21) Appl. No.: 13/645,761

(22) Filed: Oct. 5, 2012

(65) Prior Publication Data

US 2014/0072020 A1 Mar. 13, 2014

(30) Foreign Application Priority Data

Sep. 12, 2012 (EP) ..................................... 12184026

(51) Int. Cl.
*H04L 1/00* (2006.01)
*H04L 1/02* (2006.01)

(52) U.S. Cl.
USPC .......................................... 375/346; 375/267

(58) Field of Classification Search
CPC ................... H04L 27/2647; H04L 2027/0065; H04B 1/1027
USPC ................. 375/364, 267, 295, 316, 340, 346; 455/132, 137
See application file for complete search history.

(56) References Cited

U.S. PATENT DOCUMENTS

2003/0138064 A1* 7/2003 Malouche et al. ............ 375/344
2008/0130729 A1* 6/2008 Chapman et al. ............ 375/226

OTHER PUBLICATIONS

Luise et al., "Carrier Frequency Recovery in All-Digital Modems for Burst-Mode Transmissions", IEEE Transactions on Communications, vol. 43, No. 2/3/4, Feb./Mar./Apr. 1995, pp. 1169-1178.
Steven Kay, "A Fast and Accurate Single Frequency Estimator", IEEE Transactions on Acoustics, Speech, and Signal Processing, vol. 37, No. 12, Dec. 1989, pp. 1987-1989.
Michael P. Fitz, "Planar Filtered Techniques for Burst Mode Carrier Synchronization", IEEE, 1991, pp. 0365-0369.
Arslan et al., "Carrier Frequency Recovery with Linear Modulations", Chapter 3, Channel estimation in narrowband wireless communication systems, pp. 80-85, 2001.

* cited by examiner

*Primary Examiner* — Khai Tran
(74) *Attorney, Agent, or Firm* — Edell, Shapiro & Finnan, LLC (57) ABSTRACT

Techniques are provided herein for digital data-aided frequency offset estimation offering better performance and increased accuracy over existing solutions. These new techniques also allow a trade-off between complexity and accuracy to be performed. The embodiments of the techniques for frequency offset estimation can be used for correction in both feedback and feed-forward control.

16 Claims, 3 Drawing Sheets

DIGITAL DATA-AIDED FREQUENCY OFFSET ESTIMATION

FIELD OF THE INVENTION

The present disclosure relates to wireless communications devices and more particularly to techniques aimed at estimating the frequency offset error in a receiver using data-aided approaches.

BACKGROUND OF THE INVENTION

For a mobile communication system to operate satisfactorily, the transmitter and receiver must be locked in both time and frequency. This can be achieved at the receiver by controlling the frequency of the local oscillator used to down-convert the signal received at the antenna from radio frequency (RF) to base-band.

In practice there can exist a frequency error or offset in a signal received by a radio receiver. The frequency offset may be caused by transmitter frequency drift, an instantaneous Doppler frequency shift on the air interface caused by a change in the distance between a mobile terminal and a base station due to the movement of the mobile terminal, or by RF down-conversion frequency error. The presence of a frequency offset can result in inter carrier interference (ICI) and is often detrimental in the estimation process of other parameters, such as the channel gains. Hence accurate frequency offset compensation is important to achieve a satisfactory performance.

The frequency offset is typically estimated in the digital signal processing part of the signal processing chain of the receiver and then used to control the frequency reference produced by the local oscillator via a feedback loop, otherwise known as feedback correction.

This approach is very effective in conditions where the transmitter frequency is stable over time, and there are no Doppler shifts. However in a typical cellular communication system, the handover of the user equipment (UE) between base stations and the mobility of the UE mean that, due to performance degradation, the correction of any frequency offset should be made as quickly as possible.

Alternatively, or in combination with feedback correction, correction of the frequency offset can be performed in the digital signal processing stage, by first estimating the residual frequency offset and then applying a phase correction to the received signal, a feed-forward correction, to immediately remove the residual frequency offset.

The residual frequency offset can be estimated using data-aided frequency offset estimation techniques. Data-aided schemes of frequency offset estimation are based on the transmission of known data blocks, or training sequences, that allow for the estimation of the carrier frequency offset from the estimation of the phase rotation across these blocks at the receiver.

The invention described herein provides techniques for digital data-aided frequency offset estimation aimed at achieving improved accuracy and reduced complexity to provide better performance in the receiver.

SUMMARY OF THE INVENTION

The embodiments of the invention described herein provide methods for estimating the frequency offset from observed received samples and knowledge of the set of transmitted training samples.

A set of samples is first generated by element-multiplying the received samples with the complex conjugate of a reference signal dependent on the transmitted samples. It is possible to pre-scale the received samples with noise power inverse values when the noise power is not constant across the observation set. The de-rotated samples are then grouped into blocks and each block of samples is accumulated. A set of correlation values is then calculated for the accumulated samples for a number of lags.

In one embodiment of the invention, the phases associated with the correlation values corresponding to the different lags are calculated and a weighted sum of the phase values is performed to derive the frequency offset. The weights used in the weighted sum are dependent on the set of transmitted samples.

In an alternative embodiment the different correlation values are summed together and a single phase is then derived from the accumulated correlation value. A weighting factor is then applied to this phase in order to derive the frequency offset, where the weighting factor is again dependent on the set of transmitted samples.

In one embodiment the weights are based on the magnitudes of the different correlation values. In an alternative embodiment a second set of de-rotated samples is generated independently of the received signal. The first set of de-rotated samples, based on the received samples, is then used to derive the phase values whereas the second set of de-rotated samples is used to calculate the weights applied to the phase values. This alternative set of samples may be calculated as the power of the transmitted samples.

In a further embodiment, the weights are pre-computed by again generating a second set of de-rotated samples that are independent of the received samples apart from the use of a propagation channel estimate derived from the received samples. This second alternative set of samples may be calculated as the power of the transmitted samples following application of the estimated propagation channel.

The de-rotated samples are generated by multiplying the received signal with the complex conjugate of a reference signal that is dependent on the transmitted signal. In one embodiment the normal transmitted symbols are used as the reference signal, while in an alternative embodiment the propagation channel is estimated from the received signals and is applied to the known transmitted symbols to generate the reference signal. It is possible to dynamically select between these two reference signal embodiments depending on the characteristics of the propagation channel, such as the frequency selectivity of the channel.

In a further embodiment, if the midpoint of the expected frequency offset range is not zero, a frequency offset, equal to the shifted midpoint, can be included in the generation of the reference signal.

The block size can be varied, depending on the signal to noise ratio (SNR), to adapt the implementation complexity of the frequency offset estimation method to the propagation link's characteristics in order to achieve the desired estimation accuracy while limiting the computational load to reduce power consumption. In a further embodiment the block size can be adjusted based on the expected offset range, for example, by reference to the computed correlation "centre of mass", where a smaller "centre of mass" may suggest a larger capture range.

The invention described herein provides frequency estimation methods which achieve good estimation accuracy in a wide range of SNR conditions and frequently with a complexity that is lower than that of comparable prior-art solutions. This is achieved by making use of a-priori knowledge of the characteristics of the transmitter signals in combination with the observed received samples.

BRIEF DESCRIPTION OF THE DRAWINGS

For a better understanding of the present invention, reference is made, by way of example, to the following drawings. It is to be noted, however, that the appended drawings illustrate only typical embodiments and are not to be considered limiting of its scope.

DESCRIPTION OF EXAMPLE EMBODIMENTS

The embodiments of the invention described herein provide techniques for digital data-aided frequency offset estimation offering increased accuracy over existing solutions. These new techniques also allow a trade-off between complexity and accuracy to be performed. The embodiments of the techniques for frequency offset estimation can be used for correction in both feedback and feed-forward modes.

Figure 1:
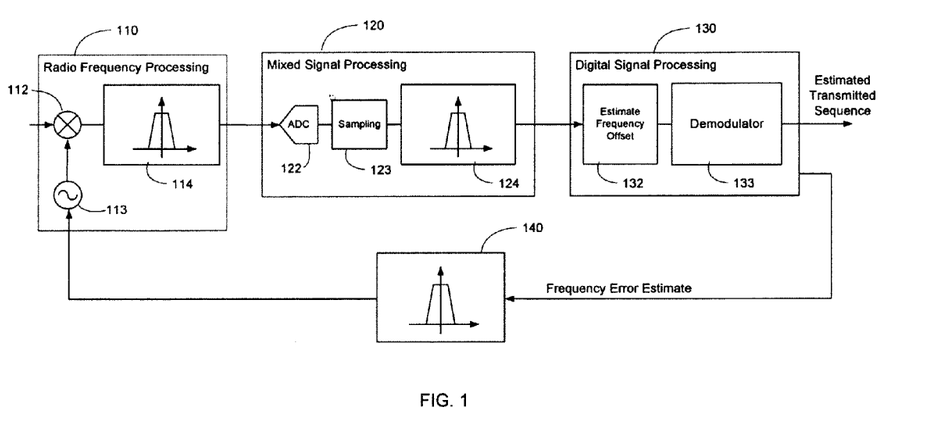
FIG. 1 shows a simplified block diagram of the mechanism for achieving frequency synchronism of a receiver with a transmitter, using feedback control.

FIG. 1 shows a simplified block diagram of the mechanism for achieving frequency synchronism of a receiver with a transmitter, using feedback correction mode. It should be noted that the blocks shown in FIG. 1 represent processing operations performed on a received signal but do not necessarily correspond directly to physical units that may appear within a practical implementation of a receiver.

The first stage corresponds to the radio frequency processing 110 where the received signal is down-converted to baseband using a mixer 112. The reference frequency used to drive the mixer is generated by the local oscillator 113. After the carrier down-conversion, the signal is low-pass filtered 114 and passed to the mixed signal processing stage 120.

In the mixed signal processing stage the signal is passed through an analog-to-digital converter (ADC) 122, sampling 123 and low pass filter 124. The resulting digital signal is passed to the digital processing stage 130 where it may be buffered in preparation for processing.

The first stage of the digital processing is to estimate the frequency offset 132 before the signals are passed to the demodulator 133. The demodulation stage produces estimates of the transmitted information bits. The estimates of the frequency offset can be filtered at 140 to improve their accuracy and used to control the frequency reference produced by the local oscillator 113.

Figure 2:
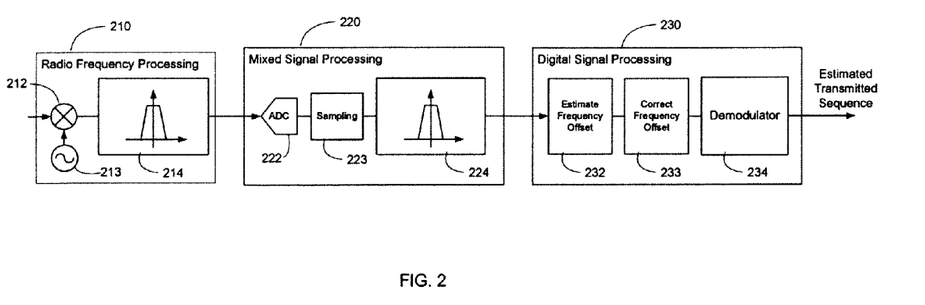
FIG. 2 shows a simplified block diagram of the mechanism for achieving frequency synchronism of a receiver with a transmitter, using feed-forward control.

FIG. 2 shows a simplified block diagram of the mechanism for achieving frequency synchronism of a receiver with a transmitter, using the feed-forward correction mode. Again it should be noted that the blocks shown in FIG. 2 represent processing operations performed on a received signal but do not necessarily correspond directly to physical units that may appear within a practical implementation of a receiver.

The radio frequency processing 210 and mixed signal processing 220 are similar to that shown in FIG. 1, whereas an extra processing stage has been added to the digital signal processing 230. The digital signal produced by the mixed signal processing 220 is first processed to estimate the frequency offset 232, as in FIG. 1. Once the frequency offset has been estimated a digital correction is applied to the received signal by the frequency offset correction 233 stage. The resulting signal, with the frequency offset removed, is then passed to the demodulator 234.

Both approaches presented in FIG. 1 and FIG. 2 need the frequency offset in the received signal to be estimated so that it can then be corrected using either a feed-forward or a feedback approach. The embodiments of the invention described herein provide methods for estimating the frequency offset f from observed received samples y and knowledge of the set of transmitted training samples x. The following model shows the relationship between the received samples, the transmitted samples and the frequency offset to be estimated:

$$y = \mathrm{diag}(e^{j[2\pi fT(0:(M-1))+\phi]})Hx + n = FHx + n \quad \text{Equation 1}$$

where f is the frequency offset to estimate and is expressed in Hertz, $\phi$ is an unknown phase expressed in Radians, H is a matrix modelling the propagation channel, and n is an M×1 vector containing the noise samples with covariance matrix $\Gamma$ which is assumed to be diagonal. M is the total number of observed samples and T denotes the sampling period expressed in seconds. Note that the vector a:b represents the inclusive interval vector:

$$\begin{bmatrix} a \\ a+1 \\ \vdots \\ b-1 \\ b \end{bmatrix}.$$

In prior-art solutions, the set of received samples y is rotated with the known transmitted samples x in order to generate a new set of received samples denoted as $\zeta$. The "two block phase difference" approach then takes the phase difference between the average of each half of $\zeta$. $\zeta$ can be expressed mathematically as:

$$\zeta = x^H \circ y \quad \text{Equation 2}$$

The operator $\circ$ represents an element by element multiplication.

$\zeta$ is divided into halves and the mean of each is taken. The phase difference can then be computed. This is then divided by $2\pi$ and then by the average distance between halves, M*T/2, to get the frequency estimate as shown in Equation 3. Without any loss of generality M can be assumed to be a multiple of 2.

$$\hat{f} = \frac{1}{\pi MT} \arg\left(\sum_{m=M/2}^{M-1} \zeta_m \sum_{m=0}^{M/2-1} \overline{\zeta}_m\right) \quad \text{Equation 3}$$

Another prior-art solution is the Kay algorithm (S. Kay, A Fast and Accurate Single Frequency Estimator, *IEEE Trans. Acoust. Speech, Signal Processing*, ASSP-37, 1987-1990, December, 1989) which takes a weighted average of the phase difference between each adjacent pair of ζ samples. This is divided by 2π and the sampling period T to get the frequency estimate.

$$\hat{f} = \frac{1}{2\pi T} \sum_{m=1}^{M-1} \gamma(m) \arg(\bar{\zeta}_m \bar{\zeta}_{m-1})$$ Equation 4

γ(m) is a smoothing function given by:

$$\gamma(m) = \frac{3}{2} \frac{M}{M^2 - 1} \left[ 1 - \left( \frac{2m - M}{M} \right)^2 \right]$$ Equation 5 for m = 1, 2, ... , M − 1

This solution, when compared to the "two block phase difference" approach is more complex as it requires multiple phases to be computed. In the "two block phase difference" approach, a single phase needs to be calculated whereas the Kay solution requires M−1 such computations. Phase computations are usually costly to implement in a digital processing engine and will typically dominate the overall complexity of the frequency offset estimation process unless their number is kept low. However, the reduction in the number of phases to be computed needs to be traded-off against the estimation accuracy performance as a larger number of phase components in the estimation process may lead to a more accurate estimate.

Another prior-art solution is the Fitz algorithm (M. P. Fitz, Planar Filtered Techniques for Burst Mode Carrier Synchronization, Conf. Rec. GLOBECOM'91, Phoenix, Ariz., Dec. 2-5, 1991) which uses the argument of the autocorrelation of ζ, R(Δ), to provide the phase increment associated with samples Δ apart. The algorithm then uses the sum of these phase increments.

The autocorrelation of is defined as:

$$R(\Delta) \triangleq \frac{1}{L - \Delta} \sum_{m=\Delta}^{M-1} \zeta_m \zeta_{m-\Delta}^*,$$ Equation 6

ΔC{1, 2, ... , M − 1}

The frequency estimate is then calculated as:

$$\hat{f} = \frac{1}{\pi T M_{max}(M_{max} + 1)} \sum_{\Delta=1}^{M_{max}} \arg(R(\Delta))$$ Equation 7

$M_{max}$ denotes the maximum correlation lag which is used for frequency offset estimation and is by definition strictly lower than M. This solution, when compared to the "two block phase difference" solution is more complex and costly to implement as it requires $M_{max}$ separate phase computations for the different arg (R(Δ)) terms. Looking at Equation 7 and Equation 4, it can be seen that the Fitz algorithm is also more complex than the Kay algorithm when $M_{max}$ is equal to M−1. Both approaches require a similar number of phases to be computed but the quantities on which these phases are computed are more complex to generate for the Fitz algorithm than for the Kay algorithm.

A variant of the Fitz algorithm with a much reduced implementation complexity can be derived by replacing the sum of phases term in Equation 7 with a phase of sum term. The phase of the average correlation can be scaled to get a frequency estimate as per the Luise and Reggiannini algorithm (M. Luise and R. Reggiannini, Carrier Frequency Recovery in All-Digital Modems for Burst-Mode Transmissions, *IEEE Trans. Commun.*, COM-43 1169-1178 February/March/April 1995).

$$\hat{f} = \frac{1}{\pi T(M_{max} + 1)} \arg \left( \sum_{\Delta=1}^{M_{max}} R(\Delta) \right)$$ Equation 8

This solution is less complex than both the Fitz and Kay algorithms as it only requires a single phase to be computed.

It is possible to improve on the performance of the prior-art solutions described so far by deriving an Approximate Maximum Likelihood (AML) estimation method (U. Mangali, A. N. D'Andrea, Synchronization Techniques for Digital Receivers, Plenum, 1997). However, as with the previous methods discussed, the impact of the propagation channel on the received signal is still unaccounted for in this method. This solution is described in Equation 9 and first takes the discrete Fourier transform (DFT) or fast Fourier transform (FFT) of ζ and then finds the output sample with the greatest modulus. The resolution of this estimation process is determined by the DFT/FFT length. The estimation accuracy will typically vary depending on the propagation channel and the characteristics of the transmitted samples. The resolution can be increased by using zero padding, however in most cases this will not result in a more accurate estimate.

$$\left| \sum_{m=0}^{M-1} \zeta_m e^{-j2\pi k m T} \right|$$ Equation 9

In Equation 9, k is the DFT frequency index. We choose the k that maximizes Equation 9 and then choose the associated frequency.

The AML solution achieves better frequency offset estimation accuracy than the other prior-art solutions but unfortunately suffers from a significant increase in the complexity associated with the implementation of this method. In the previous prior-art solutions, the complexity is mostly determined by the number of phases to be computed and essentially varies linearly with the size M of the observation set for the most complex solutions. Given that the AML solution requires the computation of a DFT/FFT on the received signal, the complexity of this approach is proportional to $M\log_2(M)$ and hence is larger than that of the other prior-art solutions for large observation sets. This increase in complexity becomes more significant as the number of samples M increases. In low SNR conditions, the number of samples required to achieve a good estimation accuracy needs to be sufficiently large to compensate for the poor received signal quality. Hence, in these conditions the complexity of the AML solution may become prohibitive.

It is therefore an objective of the invention to propose frequency estimation methods which achieve good estimation accuracy in a wide range of SNR conditions and with a complexity which is significantly lower than that of the AML solution. The methods employed in the following embodiments of the invention are restricted to data-aided frequency estimators using maximum likelihood derived methods. Moreover, unlike the AML solution which ignores the impact of the propagation channel on the received signal, the methods described in this application can make use of information on the propagation channel to improve the frequency offset estimation accuracy.

Contrary to much theoretical analysis, we do not assume an analogue matched filter since a matched filter that does not take frequency offset into account is sub-optimum. Instead, we assume ideal, rectangular low-pass filtering, thereby simplifying the analysis and improving performance. With this assumption, the AML method corresponds to the maximum likelihood (ML) method in the absence of a propagation channel. It is understood that the bandwidth of such a brick-wall filter can be made dependent on the maximum frequency error expected in the received signal. It should be clear though that the following embodiments do not preclude the use of matched or whitening filters that are digitally implemented.

Figure 3:
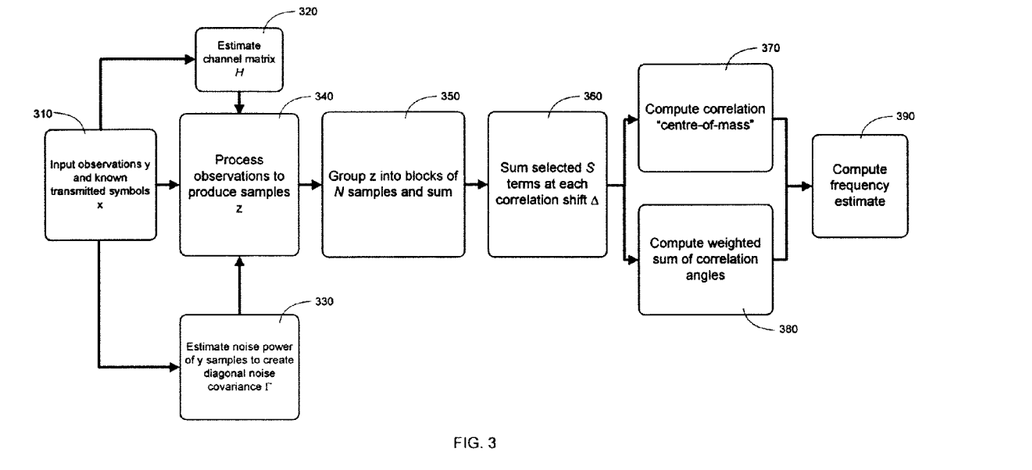
FIG. 3 is an example block diagram of one embodiment of the method for estimating the frequency offset according to the techniques described herein.

FIG. 3 shows an example block diagram of one embodiment of the proposed method for estimating the frequency offset. The inputs to the algorithm at processing stage 310 are the observed received training symbol samples, y, and the known transmitted training symbol samples, x. They samples are processed at 320 to produce a channel matrix estimate H modelling the propagation channel. A number of different techniques can be implemented for the estimation of the propagation channel and a non-exhaustive set of such techniques can be found in *Channel estimation in narrowband wireless communication systems*, Arslan, Hiiseyin, Bottomley, Gregory E., Wireless Communications and Mobile Computing. The y samples are also processed at 330 to estimate the noise power and to create the diagonal noise covariance F. It will be obvious to those persons skilled in the art that the noise power estimation may alternatively be performed once the channel estimate has been generated. Note that, although we present here the same sets of x and y samples being used for both channel and noise estimation and later the construction of z, the de-rotated observations, in fact, different sets may be used in each case.

The resulting channel matrix estimate H and noise covariance matrix Γ, along with the known transmitted symbols x, are passed to the observation processing stage 340. It is assumed that the noise covariance matrix is diagonal. Such an assumption will usually be true in practice. In conditions where such an assumption does not hold, it is possible to make use of a noise whitening filter in order to diagonalize the noise covariance matrix. The processed result, a set of M samples denoted in vector format as z, can be expressed as:

$$z = r^H \circ \Gamma^{-1} y \quad \text{Equation 10}$$

where r denotes the reference signal Hx.

In further embodiments of the method, the processing stage 340 can be simplified to reduce the overall complexity of the frequency estimation. For example, the computation of the set of samples z can be modified as:

$$z = r^H \circ y \quad \text{Equation 11}$$

The implementation of this alternative embodiment provides a complexity reduction as it does not require the computation of the noise covariance matrix. It is therefore possible to completely omit the processing steps associated with 330. Such a simplification may lead to a performance reduction in some conditions. However, performance will not be affected if the noise covariance matrix is a scaled version of the identify matrix, that is, if the power of the noise is the same for all the received samples. Hence, it would be possible to detect when such a condition is met in order to decide whether to implement this complexity reduction approach or not.

In an alternative embodiment, the computation of the set of samples z is implemented as:

$$z = r^H \circ \Gamma^{-1} y \quad \text{Equation 12}$$

using a simplification of r, where r=x.

It can be seen that in this alternative embodiment, the estimation of the propagation channel matrix H is not required. Hence, it is possible to omit the different processing steps associated with 320. As with the previous simplification, the omission of the processing steps usually performed in 320 can lead to degradation in the accuracy of the generated frequency offset. However, in the absence of multipath and fading the channel matrix H will become a scaled version of the identity matrix and this alternative embodiment will not suffer from any performance loss. Hence, it would be possible to detect whether the propagation channel corresponds to multipath and fading conditions or not in order to decide whether to implement this alternative embodiment or not.

It is possible to combine the simplifications presented in the two previous alternative embodiments in order to derive yet a further embodiment of the invention. In this alternative embodiment, the computation of the set of samples z is modified as:

$$z = x^H \circ y \quad \text{Equation 13}$$

It can be seen that this alternative embodiment offers the lowest complexity as the processing steps performed both in 320 and 330 can be omitted. Moreover, it is possible to use information on statistics of the noise power, and power delay profile and fading of the propagation channel, in order to decide whether or not to implement this simplified version for the generation of the set of samples z.

In a further embodiment it is also possible to include the midpoint of the expected frequency offset range $f_{mid}$, where this is not zero, in the reference signal r, as given by:

$$r = \text{diag}(e^{j[2\pi f_{mid} T(0:(M-1))]}) Hx$$

or $$r = \text{diag}(e^{j[2\pi f_{mid} T(0:(M-1))]}) x \quad \text{Equation 14}$$

The processed results, the de-rotated samples z, are then grouped into blocks in process stage 350 and summed. The samples of z are grouped into L blocks of N samples. In order to optimise the observation set into a multiple of N (typically a multiple of 4), the total of L×N samples, represented by M̃, may exclude initial and/or final z samples from the blocked result, s.

$$s_l = \sum_{\substack{m \geq NL \\ m < N(l+1)}} z_{m+\text{offset}}, \quad \text{Equation 15}$$

for $l \in \{0, 1, 2 \ldots L-1\}$

In a further embodiment, assuming the total number of samples N is fixed, the block size can be varied depending on the signal to noise ratio (SNR). As the SNR decreases the block size can be reduced by grouping the samples z into a larger number of blocks L. This increases the computational complexity but enhances the performance. Conversely, if the SNR increases the block size can be increased by grouping the samples z into a smaller number of blocks L. This reduces the computational complexity while maintaining an acceptable level of performance and can provide benefits in terms of power consumption. Hence, in this embodiment, it is possible to adapt the implementation complexity of the frequency offset estimation method to the propagation link's characteristics in order to achieve the desired estimation accuracy. A number of different approaches can be used to determine the propagation link SNR so as to vary the block size. For example, it is possible to calculate the power of the received signal from the channel matrix H calculated in 320 and combine this value with elements of the noise covariance matrix Γ in order to generate a SNR. Alternatively, the SNR could be derived directly from the received signal samples without the need for computing either the channel matrix or the noise covariance matrix.

In process stage 360, correlation values C(Δ) of the s samples are computed. The subset of correlation terms of s used to generate each correlation value may be varied according to complexity and performance considerations and is indicated by l∈S(Δ) in Equation 16 where Δ satisfies 0<Δ<L.

$$C(\Delta) = \sum_{l \in S(\Delta)} s_l \bar{s}_{l-\Delta} \qquad \text{Equation 16}$$

An example of the computation where the fullest possible set of correlation terms is processed, is given by:

$$C(\Delta) = \sum_{l=\Delta}^{L-1} s_l \bar{s}_{l-\Delta} \qquad \text{Equation 17}$$

The flexibility to select the set of correlation terms used, i.e. determine S(Δ) in Equation 17, allows trade-offs between algorithm complexity and performance to be made. As an example, to satisfy a capture range requirement, correlation terms could be limited to only those with lag Δ less than or equal to a fixed maximum value. The smaller such a fixed maximum lag, the greater the estimator's capture range may be although this will come at a cost of worsening variance.

As a further embodiment, the number of blocks used can be adjusted to widen or narrow the capture range of the estimator. Adjusting the number of blocks changes the effective maximum lag which is equal to the maximum lag multiplied by the block size. For example, assuming all available lags are used in process stage 360 and the estimator has the property that capture range increases with decreasing effective maximum lag, then, to widen the capture range of the estimator, the block size selected in process stage 350 can be increased. To reduce the capture range, the block size can be reduced. This is an example of how the block size can be used to indirectly control the capture range of the estimator because of its effect on the effective maximum lag.

The correlation values C(Δ) generated by process stage 360 are passed to process stage 370 to compute the correlation "centre of mass" δ.

$$\delta = \frac{\sum_{\Delta=1}^{L-1} |C(\Delta)| N \Delta}{\sum_{\Delta=1}^{L-1} |C(\Delta)|} \qquad \text{Equation 18}$$

Alternatively, when N>1, δ can be defined in a different way using correlations of un-summed z samples rather than s samples. A particular subset of possible $z_l \bar{z}_{l-\Delta}$ correlation terms is used in this definition; this subset is defined to be exactly the terms present in the $z_l \bar{z}_{l-\Delta}$ expansion of $\Sigma_{\Delta=1}^{L-1} C(\Delta)$ and is denoted by l∈Ω(Δ) in the following definition:

$$\delta = \frac{\sum_{\Delta=1}^{M-1} \left| \sum_{l \in \Omega(\Delta)} z_l \bar{z}_{l-\Delta} \right| \Delta}{\sum_{\Delta=1}^{M-1} \left| \sum_{l \in \Omega(\Delta)} z_l \bar{z}_{l-\Delta} \right|} \qquad \text{Equation 19}$$

In a further embodiment of the method, the process 370 can be simplified by either pre-computing δ (based on, for example, $z = x^H \circ x$) or computing δ independently of y based on, for example, $z = (Hx)^H \circ Hx$.

The correlation values C(Δ) generated by process stage 360 are also passed to process stage 380 to compute the phase difference 0 as the weighted sum of correlation phases arg{C(Δ)}.

$$0 = \sum_{\Delta=1}^{L-1} w_\Delta \arg\{C(\Delta)\} \qquad \text{Equation 20}$$

$w_\Delta$ represents the weights of arg{C(Δ)} and is given by:

$$w_\Delta = \frac{|C(\Delta)|}{\sum_{\Delta=1}^{L-1} |C(\Delta)|} \qquad \text{Equation 21}$$

In a further embodiment of the method, the process 380 can be simplified by pre-computing the weights $w_\beta$ based on $z = x^H \circ x$. In this embodiment, the phases of the correlation values C(Δ) are still used in the frequency offset estimation and hence depend on the received signal. The weights $w_\Delta$ are however rendered independent of the received signal samples. It should be noted that the weights still vary with the transmitted sequence samples x.

Alternatively $w_\Delta$ can be computed independent of y, using either the channel or the noise, based on, for example, $z = (Hx)^H \circ Hx$.

The phase difference sample θ computed in process stage 380 is then used by process stage 390 to compute the frequency offset estimate f̂.

$$\hat{f} = \frac{1}{2\pi T \delta} \theta \qquad \text{Equation 22}$$

It can be seen from Equation 20 and Equation 21 that according to the present invention, the derivation of the frequency offset estimate requires the computation of weights to be applied to phase values. These weights depend on the properties of the transmitted signal through the component |C(Δ)| and hence are calculated using a-priori knowledge of the transmitted signal. This is different to the prior-art solutions where the weights do not require a-priori knowledge of, or are even independent of the transmitted signal. For example, in the Fitz approach the computed phase is scaled by a value determined by $M_{max}$ which only depends on the number of samples that have been processed and is independent of the received observations or transmitted samples. In the Kay algorithm, the phases arg($\zeta_m \bar{\zeta}_{m-1}$) are scaled by values which again are independent of the set of transmitted samples. The need to have and use a-priori knowledge of the transmitted samples is a significant difference between the prior-art solutions and the approach presented in this document. By making use of knowledge on the characteristics of the transmitted signal, the different techniques presented in this document can provide better frequency offset estimation accuracy than the prior-art solutions. The techniques presented in this document can also offer performance advantages over prior-art solutions by making use of knowledge on the propagation channel, as presented in Equation 10 for example.

In terms of implementation complexity, it can be seen from Equation 20 that the new frequency offset estimation method requires a similar number of phase computations to the Fitz and Kay approaches when the block size is equal to 1. With this configuration for the new estimator, the number of phases to be calculated is proportional to the number of received samples. It is possible to reduce the computational load associated with the new estimator by using a block size larger than 1. The reduction in the number of phases that need to be computed scales linearly with the code block size. Hence, it is possible to achieve a significant complexity reduction through the use of large blocks. As already indicated in previous paragraphs, this complexity reduction will be associated with a performance loss and the impact of this poorer estimation accuracy can be mitigated by limiting the use of large blocks to good signal conditions.

Figure 4:
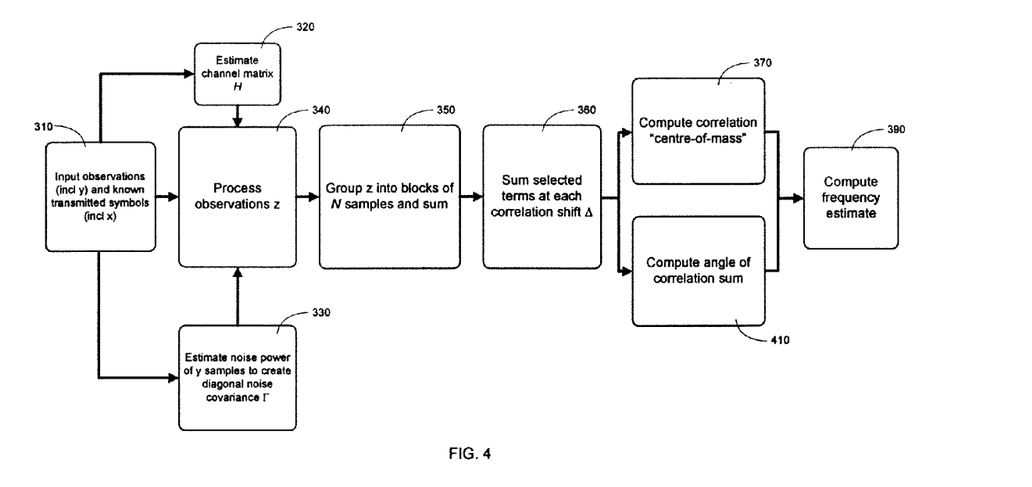
FIG. 4 is an example block diagram of a further embodiment of the method for estimating the frequency offset according to the techniques described herein.

Alternatively, it is possible to reduce the computational complexity by making use of the further embodiment presented in FIG. 4. The initial processes 310-370 of this alternative embodiment are identical to those of FIG. 3.

The correlation values $C(\Delta)$ generated by process stage 360 are passed to process stage 410 to compute the phase difference $\theta$ from the sum of the correlation phase samples.

$$\theta = \arg\left(\sum_{\Delta=1}^{L-1} C(\Delta)\right) \quad \text{Equation 23}$$

The computed correlation centre of mass $\delta$ and the phase difference $\theta$ are then used, as previously, by process stage 390 to compute the frequency offset estimate $\hat{f}$.

$$\hat{f} = \frac{1}{2\pi T \delta} \theta \quad \text{Equation 24}$$

It is understood that the complexity reduction approaches presented in earlier paragraphs for the algorithm presented in FIG. 3 are also applicable for the approach of FIG. 4.

It can be seen that the method described in FIG. 4 is of lower complexity than the method presented in FIG. 3. The approach described in FIG. 3 requires L different phases to be computed whereas the algorithm described in FIG. 4 can be implemented with a single phase computation.

When compared to the two block phase algorithm and the Kay algorithm the methods of both FIGS. 3 and 4 give more accurate results. The methods of FIGS. 3 and 4 are less complicated than the Kay algorithm, in that the Kay algorithm requires M−1 phases to be computed whereas the embodiments shown only require at most L−1 phases, and give similar or better results than the Fitz and Luise and Reggiannini algorithms in the absence of blocking. The embodiments presented above thus represent an improvement on the prior-art examples given, in terms of the accuracy of the frequency offset estimation and complexity of the receiver. When multipath is present and H is used in the methods of FIGS. 3 and 4, significantly better estimation accuracy is expected compared to methods not using H (including all prior-art examples given).

In further embodiments of the invention it may not be necessary to possess a-priori knowledge of the transmitted training samples. It is also possible to use estimated samples resulting from a partial demodulation process to construct a sequence to be used for carrier frequency offset estimation. This method may not be as accurate as using the a-priori knowledge of the training sequences as errors may degrade the performance.

Figure 5:
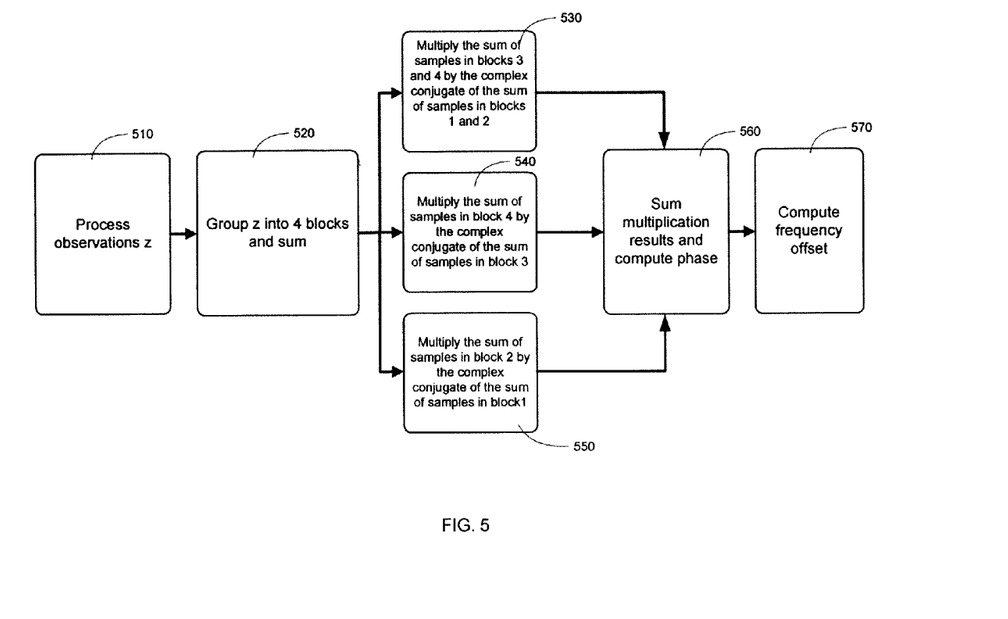
FIG. 5 shows an example of the embodiment where the samples are grouped in four blocks.

An example embodiment of the approach described in FIG. 4 is presented in FIG. 5. The processed observations 510 are grouped into four blocks and summed at 520. The backward-facing block correlations are individually computed at 530, 540 and 550. At 530 the sum of the samples in the third and fourth blocks are multiplied by the complex conjugate of the sum of the samples in the first and second blocks. Similarly, in 540 the sum of the samples in the fourth block is multiplied by the complex conjugate of the sum of the samples in the third block, and in 550 the sum of the samples in the second block is multiplied by the complex conjugate of the sum of the samples in the first block.

The results of the multiplications in 530, 540 and 550 are summed in 560 and the phase of the resulting quantity is then computed. The output from the processing in 560 is then used to compute the frequency offset at 570.

The mathematical derivation of the approach presented in FIG. 5 will now be presented and then mapped to the different processing blocks identified in FIG. 5.

Dividing the z samples into four quarters and applying the frequency offset calculation at Equation 24, with the phase difference calculation of Equation 23 and using the full set of correlation terms given by Equation 17, we arrive at the following realisation:

$$\hat{f} = \frac{1}{2\pi T \delta} * \arg\left(\sum_{l=3\hat{M}/4}^{\hat{M}-1} z_l \left(\sum_{l=0}^{\hat{M}/4-1} \bar{z}_l + \sum_{l=\hat{M}/4}^{\hat{M}/2-1} \bar{z}_l + \sum_{l=\hat{M}/2}^{3\hat{M}/4-1} \bar{z}_l\right) + \right.$$
$$\left. \sum_{l=\hat{M}/2}^{3\hat{M}/4-1} z_l \left(\sum_{l=0}^{\hat{M}/4-1} \bar{z}_l + \sum_{l=\hat{M}/4}^{\hat{M}/2-1} \bar{z}_l\right) + \sum_{l=\hat{M}/4}^{\hat{M}/2-1} z_l \sum_{l=0}^{\hat{M}/4-1} \bar{z}_l\right) \quad \text{Eequation 25}$$

where L=4 and $\hat{M}$ is a multiple of 4 given by N×L.

Computationally, Equation 25 can be simplified to:

$$\hat{f} = \frac{1}{2\pi T \delta} * \arg \quad \text{Equation 26}$$
$$\left(\sum_{l=\hat{M}/2}^{\hat{M}-1} z_l \sum_{l=0}^{\hat{M}/2-1} \bar{z}_l + \sum_{l=3\hat{M}/4}^{\hat{M}-1} z_l \sum_{l=\hat{M}/2}^{3\hat{M}/4-1} \bar{z}_l + \sum_{l=\hat{M}/4}^{\hat{M}/2-1} z_l \sum_{l=0}^{\hat{M}/4-1} \bar{z}_l\right)$$

The correlation "centre of mass" is derived using Equation 18. If we compute z independently of y by either $(x^H \circ x)$ or $((Hx)^H \circ Hx)$ and assume z is constant (i.e. the signal power is constant) and hence s is constant, then we can simplify equation 18 so that with L=4, δ reduces as follows:

$$\delta = \frac{\sum_{\Delta=1}^{L-1}\left|\sum_{l=\Delta}^{L-1}S_l\bar{S}_{l-\Delta}\right|N\Delta}{\sum_{\Delta=1}^{L-1}\left|\sum_{l=\Delta}^{L-1}S_l\bar{S}_{l-\Delta}\right|} = \frac{\sum_{\Delta=1}^{L-1}\sum_{l=\Delta}^{L-1}N\Delta}{\sum_{\Delta=1}^{L-1}\sum_{l=\Delta}^{L-1}1} = \frac{N\sum_{\Delta=1}^{L-1}(L-\Delta)\Delta}{\sum_{\Delta=1}^{L-1}(L-\Delta)}$$

$$= \frac{N(L+1)}{3} = \frac{\tilde{M}}{L}\frac{(L+1)}{3}$$

$$\frac{5}{12}\tilde{M}$$

Equation 27

The complete calculation presented in FIG. 5, can then be derived from Equation 26 and the resulting δ given in Equation 27:

$$\hat{f} = \frac{6}{5\pi\tilde{M}T}\arg$$

$$\left(\sum_{l=\tilde{M}/2}^{\tilde{M}-1}z_l\sum_{l=0}^{\tilde{M}/2-1}\bar{z}_l + \sum_{l=3\tilde{M}/4}^{\tilde{M}-1}z_l\sum_{l=\tilde{M}/2}^{3\tilde{M}/4-1}\bar{z}_l + \sum_{l=\tilde{M}/4}^{\tilde{M}/2-1}z_l\sum_{l=0}^{\tilde{M}/4-1}\bar{z}_l\right)$$

Equation 28

It can be seen that the processing performed in 530 corresponds to the computation of the first term $\Sigma_{l=\tilde{M}/2}^{\tilde{M}-1}z_l \Sigma_{l=0}^{\tilde{M}/2-1}\bar{z}_l$ in Equation 28. The computation of the second term in Equation 28 is implemented in 540 and finally, the last term is computed by 550. The phase of the sum of these three terms is derived in 560 and this value is then scaled by $$\frac{\delta}{5\pi\tilde{M}T}$$

in 570 to generate the estimate of the frequency offset.

Although the apparatus, system, and method are illustrated and described herein as embodied in one or more specific examples, it is nevertheless not intended to be limited to the details shown, since various modifications and structural changes may be made therein without departing from the scope of the apparatus, system, and method, and within the scope and range of equivalents of the claims. Accordingly, it is appropriate that the appended claims be construed broadly and in a manner consistent with the scope of the apparatus, system, and method, as set forth in the following claims.

What is claimed is:

1. A method for estimating frequency offset in a signal received through a radio propagation channel, comprising:
    estimating the frequency offset from at least one phase derived from the received signal, wherein a weight dependent on characteristics of a transmitted signal is applied to the phase,
    wherein the characteristics of the transmitted signal are derived from a set of estimated transmitted samples resulting from a demodulation process, and
    wherein a second set of samples is calculated by scaling and de-rotating the received signal where the de-rotation is configured to be dependent on phase contributions from at least one of the transmitted signal and the radio propagation channel, and the at least one phase used in the frequency offset estimation is derived from the second set of samples.

2. The method of claim 1, wherein the transmitted signal comprises a known training sequence from which the characteristics of the transmitted signal are derived.

3. The method of claim 2, wherein the weight is precomputed independently of the received signal.

4. The method of claim 1, wherein the weight is dependent on the power of the transmitted signal.

5. The method of claim 1, wherein the at least one phase used in the frequency offset estimation is derived from a plurality of correlation terms that are calculated on the second set of samples.

6. The method of claim 5, wherein at least one of the at least one phase is calculated as a sum of the correlation terms.

7. The method of claim 1, further comprising:
    grouping adjacent samples from the second set of the samples to form a plurality of groups, in a way that the frequency offset estimate is generated from the at least one phase calculated using a value derived from each group.

8. The method of claim 7, wherein the number of samples in each group is adapted to a maximum value of the frequency offset to be estimated.

9. The method of claim 7, wherein the number of samples in each group is adapted according to properties of the received signal.

10. An apparatus for estimating frequency offset in a signal received though a radio propagation channel, the apparatus comprising:
    a radio frequency processing stage configured to process a received signal that is received through a propagation channel;
    a mixed signal processing stage configured to receive an output from the radio frequency processing stage; and
    a digital signal processing stage configured to receive an output from the mixed signal processing stage and to estimate the frequency offset from at least one phase derived from the received signal, wherein a weight dependent on characteristics of a transmitted signal is applied to the phase,
    wherein the characteristics of the transmitted signal are derived from a set of estimated transmitted samples resulting from a demodulation process, and
    wherein the digital signal processing stage is further configured to calculate a second set of samples by scaling and de-rotating the received signal where the de-rotation is configured to be dependent on phase contributions from at least one of the transmitted signal and the radio propagation channel, and the at least one phase used in the frequency offset estimation is derived from the second set of samples.

11. The apparatus of claim 10, wherein the transmitted signal comprises a known training sequence from which the characteristics of the transmitted signal are derived.

12. The apparatus of claim 11, wherein the weight is precomputed independently of the received signal.

13. The apparatus of claim 10, wherein the weight is dependent on the power of the transmitted signal.

14. The apparatus of claim 10, wherein the at least one phase used in the frequency offset estimation is derived from a plurality of correlation terms that are calculated on the second set of samples.

15. The apparatus of claim 14, wherein at least one of the at least one phase is calculated as a sum of the correlation terms.

16. The apparatus of claim 10, wherein the digital signal processing stage is further configured to:
    group adjacent samples from the second set of the samples to form a plurality of groups, in a way that the frequency offset estimate is generated from the at least one phase calculated using a value derived from each group.

* * * * *